UNITED STATES PATENT OFFICE.

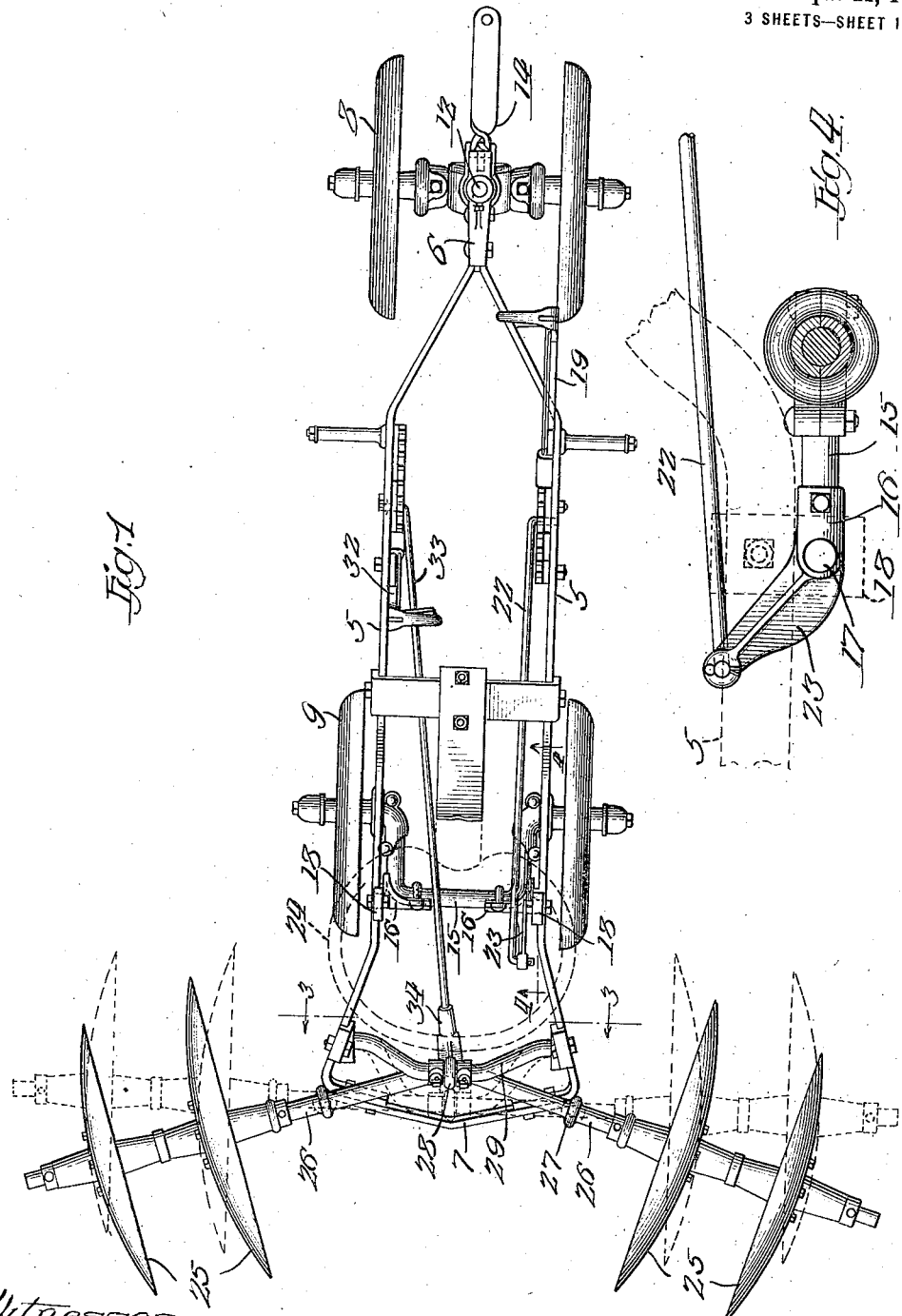

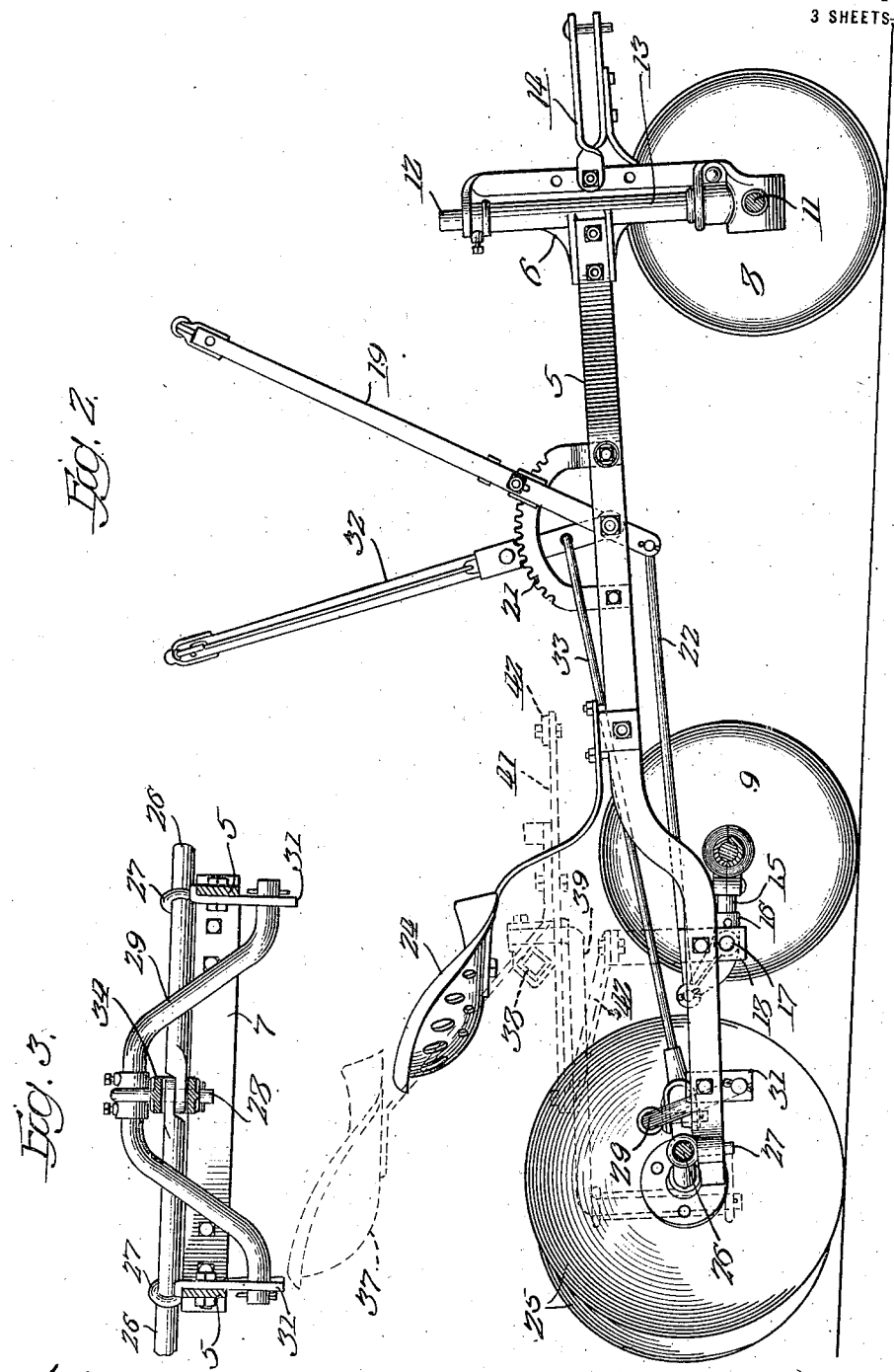

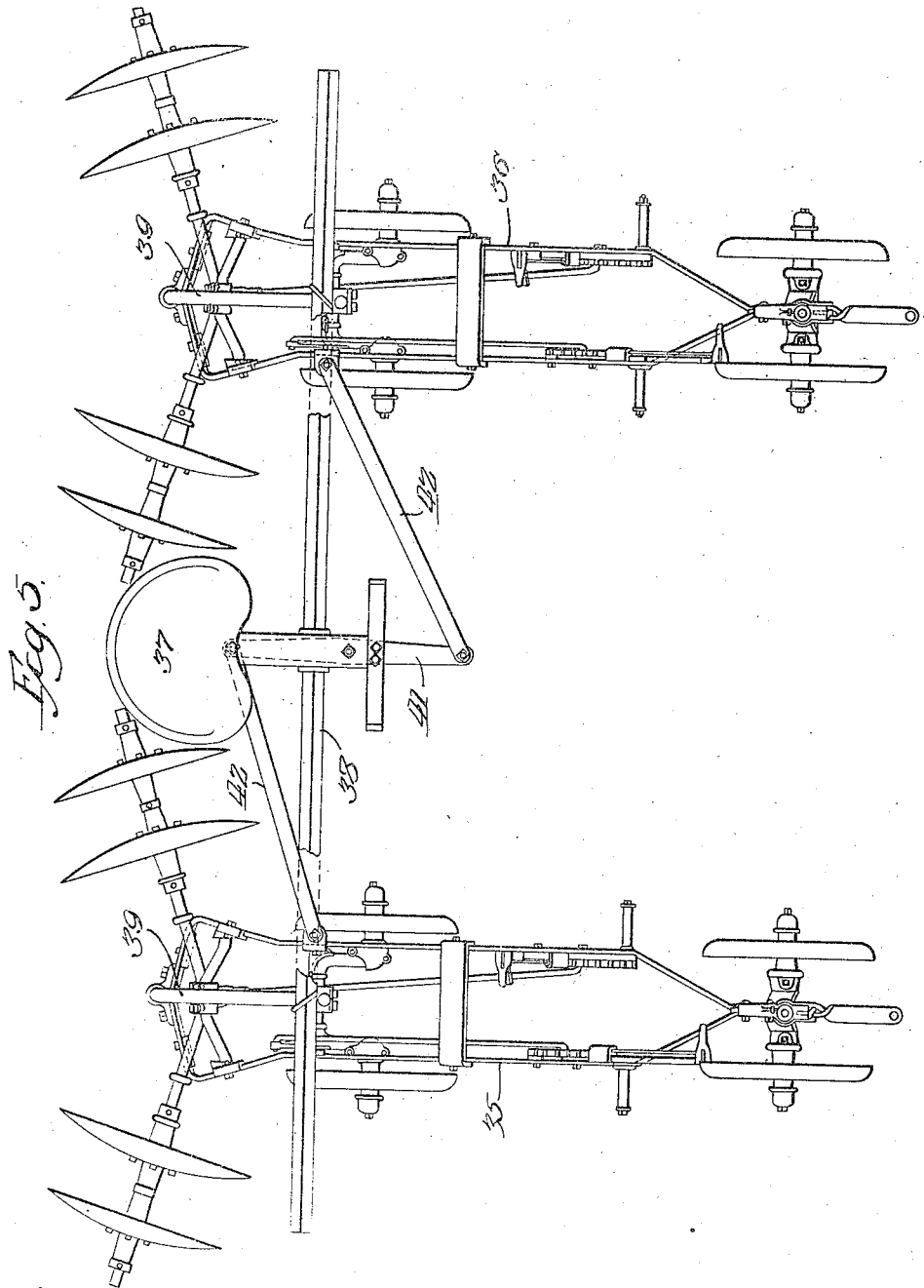

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

RIDGE-LEVELING HARROW.

1,178,767.  Specification of Letters Patent.  Patented Apr. 11, 1916.

Application filed June 12, 1915.  Serial No. 33,677.

*To all whom it may concern:*

Be it known that I, LEWIS E. WATERMAN, a citizen of the United States, residing at Rockford, in the county of Winnebago and State of Illinois, have invented certain new and useful Improvements in Ridge-Leveling Harrows, of which the following is a specification.

This invention relates in general to harrows and has more particular reference to those adapted for leveling ridges formed by a lister.

In farming sections of the country where the rain-fall is light, it is customary, either in the fall after harvest or in the early spring, to list the fields, that is, work the ground into alternate ridges and furrows so that moisture may be retained by the ridges. When lister planting is desired, a lister is drawn over the ridges furrowing out the same and planting the seed in the moisture laden soil. But when it is desired to plant with other seeding implements, such for instance as a check-row corn planter or a grain drill, it is necessary to level the ground prior to the seeding operation, and to this end my invention provides an implement of novel construction for leveling the ridges formed by a lister.

In providing such an implement my object has been, primarily, to construct a guide frame which will so tread in a single furrow and carry disk devices adapted for leveling the ridges flanking the said furrow, as to maintain the disks in the desired relation to the ridges and against the tendency to run to the right or left due to varying conditions of the soil and irregularities in the height of the ridges which cause varying resistance to the disks.

Another object of my invention is the provision of a wheel-mounted harrowing implement of the above character which serves as a rolling guide for the disks and is light of draft and includes a pair of front dirigible wheels which serve as a pole truck, permitting the implement to be easily turned and guided.

Further objects of my invention are to provide a simple and durable means of improved construction for holding the disk devices of the harrowing implement in operative position and angling them more or less to the line of draft, and to mounting the rear supporting-wheels on a crank member whereby the frame and likewise the disk devices may be raised and lowered and the working depth of the disk devices regulated.

My invention also contemplates the provision of means for connecting two harrowing implements of the above character to tread side by side in alternating furrows so that one driver may operate both implements, the connection being such that the driver's seat will be automatically maintained centrally between the two implements regardless of lateral deviation of either implement with respect to the other.

My invention, its mode and principle of operation will be better understood by reference to the following specification when considered in connection with the accompanying drawings, wherein:

Figure 1 is a plan view of a harrowing implement embodying my invention; Fig. 2 is a side elevation of the implement, the near disk device and supporting wheels being removed; Figs. 3 and 4 are enlarged detail views taken on the lines 3—3 and 4—4, respectively of Fig. 1; and Fig. 5 is a plan view of a pair of improved harrowing implements connected together in a novel manner.

The ensuing description of the construction and operation of my improved harrowing implements has reference particularly to Figs. 1 to 4 inclusive. The frame of the harrowing implement, comprising a pair of spaced side bars 5 converging at their forward ends and bolted to a bracket 6 and diverging at their rear ends and connected by a cross-bar 7, is supported at its front end by a pair of dirigible wheels 8 and its rear end by a pair of wheels 9 mounted so as to be movable vertically with respect to the frame. The carrying wheels of the frame, which is narrow in width and disposed relatively close to the ground, are arranged so as to tread in a single furrow between two adjacent ridges; and by reason of this construction and since the front and rear wheels are considerably spaced apart, the wheel-mounted frame provides a very efficient means for holding disk devices carried by the frame in operative position against the tendency to run out of the ridge, occasioned by changes in conditions of the soil and irregularities in the ridges.

Referring more particularly to the mounting of the supporting wheels on the frame, the front wheels 8, axles 11 therefor, upright post 12 rotatably mounted and held against axial movement in the sleeve bearing 13 formed integral with the bracket 6, and the draft attachment 14 connected with said post and axle, constitute a dirigible truck supporting the front end of the frame. The rear wheels 9 journaled on the end portions of an arched crank member 15, which is interposed between the side bars 5 and has brackets 16 secured to its inner or arched end and pivoted at 17 in the brackets 18 depending from the side bars, are movable vertically with respect to the frame by swinging movement of said arched member on its pivots 17.

Manually adjustable means comprising a lever 19 pivoted on the frame, equipped with the usual spring-pressed latch engaging the sector 21, and connected to the arched crank member through the intermediary of a link 22 and an arm 23 secured to the crank member, are provided for moving the wheels 9 vertically and locking the wheels in said position with respect to the frame.

The harrowing tools consisting of rotary disk devices disposed opposite each side of the frame are mounted on the rear portion thereof so that the weight of the driver on the seat 24 mounted above and upon the rear portions of the frame, serves to hold the harrowing tools in the ground during operation. The disk devices comprise two pairs of disks 25, each pair being rotatably mounted on an axle 26 disposed transversely of the frame with its disk-equipped end outermost and pivotally connected intermediate its ends thereto through the intermediary of a swivel eye 27 pivoted on a vertical axis to a rear corner portion of the frame. Thus, with the disk axles in substantially axial alinement, the inner ends of the axles may be actuated by a common means to swing the axles horizontally on the swivel eyes so as to angle the disks to the line of draft.

As shown clearly in Fig. 3, the inner ends of the disk axles are pivotally connected to the arched portion of a bail or arched crank member 29 interposed between the side bars 5 and pivotally mounted at its ends on brackets 31 depending from said side bars. By rocking the arched crank member by suitable means as for instance by an ordinary sector-engageable hand lever 32 pivoted on the frame and connected by means of a link 33, provided with a bifurcated end 24 pivoted to the pin 28, the axles may be adjusted to angle the disks more or less to the line of draft and to set the disks at any desired working angle.

It will be apparent that in adjusting the disk axles from the full-line position shown in Fig. 1 to the dotted line position, the outer ends of the axles will be raised slightly because of their connection to the bail 29. This vertical movement, however, of the outer ends of the axle is merely incidental to the structure employed for adjusting the axles, by reason of the arcuate path through which the inner ends of the axles will move, and is of no import in the operation of the harrow.

The harrowing implement as illustrated on the drawings in full lines is in working position, that is, the lever 19 has been adjusted to raise the wheels 9 with respect to the frame thereby lowering the disks so that they will penetrate substantially to the level of the furrow in which the implement is drawn, and the lever 32 has been adjusted to angle the disks to the line of draft. When the implement is drawn, the wheels treading in a single furrow between the two adjacent ridges formed by a lister, it will be apparent that the disks 25 will penetrate the ridges flanking the furrow and turn the soil inwardly, thus leveling the ridges. Since the ridges are more or less irregular in height and the soil varies in hardness, the implement is influenced to skid sidewise in the course of least resistance. This tendency, however, is restricted by the wheel-mounted frame, which in reality is a rolling guide.

It will be apparent that since the wheels are of narrow tread and are considerably spaced, they serve, through engagement with the lower side walls of the furrow, to very effectively hold the disks against lateral displacement relatively to the ridges. It will also be apparent that through the adjustments provided by the levers 19 and 32 the working depth and the capacity of the disks may be varied in accordance with the size and ground conditions of the ridges, and that the rolling guides, considering the function of guiding the disks against lateral displacement, result in an implement of light draft. If desired, the arrangement of the disks on the axle may be altered, that is, the larger disks positioned outermost or a greater number of disks provided in accordance with the size of the ridges.

Referring now to Fig. 5 and to the dotted line attachment in Fig. 2, I have illustrated two of my improved harrowing implements designated in general by reference characters 35 and 36, the seats 24 having been removed, connected by an equalizing seat-supporting device so that the two implements may be operated by a single operator and the implements held properly in the ground during operating. It will be noted that a seat 37 mounted on a transverse bar 38 pivotally connected by links 39 to the rear end of the implement frames is swingable laterally with respect to said frames by reason of the said pivotal link connection, and that the weight of the operator on the seat serves to hold the disk devices of both implements in the ground during operation, and that this weight is distributed evenly to both implements. The seat 37 is maintained centrally between the two harrowing implements by means of an equalizing device comprising a lever 41 pivotally mounted on the bar 38 and connected to the two implements by means of links 42.

Each implement is drawn by a separate team of horses, the arrangement being such that the two implements will tread in alternating furrows, that is, furrows spaced by an intermediate furrow. Should one implement be guided laterally to either side with respect to the other implement by an irregularity in its furrow, or because of unlevel ground, or for other reasons, the seat would be correspondingly moved laterally, but only one-half the distance of the implement movement; and thus, the driver is always carried equidistant from each implement so that he will not be inconvenienced in the management and operation of the implements in case either of the same are deviated laterally. This device connecting the two implements also holds them in proper relation relatively to each other when turning at the ends of the furrows.

I claim:

1. A harrow for leveling ridges formed by a lister or the like, comprising a frame, supporting wheels therefor arranged to tread in a single furrow between two adjacent ridges and comprising a pair of front dirigible wheels and a pair of rear wheels, disk axles mounted on the rear portion of the frame extending transversely thereto and projecting beyond the sides thereof, rotary disks mounted on the outer portions of said axles, means for adjusting the disks relatively to the line of draft and means for raising and lowering the disks with respect to the supporting wheels.

2. A harrow for leveling ridges formed by a lister or the like, comprising a frame, a pair of supporting wheels connected to the rear portion of the frame and movable vertically with respect thereto, a pair of dirigible supporting wheels connected to the front portion of the frame, said wheels being arranged to tread in a single furrow between two adjacent ridges, a pair of transverse disk axles arranged in substantially axial alinement at the rear portion of the frame, each axle being pivoted intermediate its ends to the frame on a separate vertical axis, rotary disks mounted on the outer portions of the axles, means connected to the inner ends of the axles for swinging them on their pivots to angle the disks to the line of draft, and means for moving the rear supporting wheels vertically with respect to the frame whereby to raise and lower the disk axles and to determine the working depth of the disks.

3. In a harrow, the combination of a frame, a pair of substantially axially alined disk axles extending transversely of the frame and pivoted thereto intermediate their ends on vertical axes, rotary disks mounted on the axles at the outer side of their pivot axes, a crank member mounted on the frame and pivotally connected with the inner end of said axles, and means for rocking said crank member whereby to angle the disks to the line of draft.

4. In a harrow, the combination of a frame, a pair of substantially axially alined disk axles extending transversely of the frame and pivoted thereto intermediate their ends on vertical axes, rotary disks mounted on the axles at the outer side of their pivot axes, an arched member, the ends of which are pivoted on the frame on horizontal axes, a pivotal connection between the arched portion of said member and the inner ends of said disk axles, and means for swinging said arched member on its pivots to angle the disks to the line of draft.

5. A harrow for leveling ridges formed by a lister or the like, comprising a wheel-mounted frame, a pair of disk axles carried by the frame and projecting laterally beyond the sides thereof, rotary disks mounted on the projecting portions of the axles, means including a lever-controlled arched crank member for adjusting the axles to angle the disks to the line of draft, and means for raising and lowering the disks with respect to the carrying wheels of the frame.

6. A harrow for leveling ridges formed by a lister or the like, comprising a narrow, elongated frame, supporting wheels therefor arranged to tread in a single furrow between two adjacent ridges and comprising a pair of dirigible wheels connected to the front portion of the frame, a pair of wheels so mounted on the rear portion of the frame as to be adjustable vertically with respect thereto, a pair of transverse disk axles pivoted on the rear portion of the frame on vertical axes and extending laterally beyond the sides of the frame, disks mounted on the outer portions of said axles, means for adjusting the axles on their pivots to angle the disks more or less to the line of draft, and means for adjusting the rear wheels vertically with respect to the frame whereby to raise and lower the disks.

7. In a harrow, the combination of a frame, a pair of transverse, substantially axially alined disk axles each pivotally mounted intermediate its ends on the frame and arranged so that its outer portion extends laterally beyond the adjacent side of the frame, disks mounted on the outer portions of said axles, said pivotal mountings of the disk axles being such that the axles may swing horizontally and slide axially, a bail pivoted on the frame and connected at its outer end with the inner ends of said disk axles so that by rocking the bail the disks will be angled more or less to the line of draft, and adjustable means for rocking the bail.

LEWIS E. WATERMAN.